United States Patent

[11] 3,580,080

[72] Inventor Earl Stuart Perkins
   Oak Brook, Ill.
[21] Appl. No. 796,491
[22] Filed Feb. 4, 1969
[45] Patented May 25, 1971
[73] Assignee Butler National Corporation
   Minneapolis, Minn.

[54] FULL DATA ALTIMETER DISPLAY
   9 Claims, 1 Drawing Fig.
[52] U.S. Cl. ....................................................... 73/384
[51] Int. Cl. ....................................................... G01l 7/20
[50] Field of Search ............................................. 73/384,
   386, 387, 178; 116/129; 348/112.2

[56] References Cited
   UNITED STATES PATENTS
2,740,294 3/1956 Sanders, Jr. et al. .......... 73/178

Primary Examiner—Donald O. Woodiel
Attorney—Hill, Sherman, Meroni, Gross & Simpson ABSTRACT: An altimeter which continuously presents to the pilot the altitude of an aircraft above ground derived from a radio altimeter or other source and which simultaneously presents to the pilot the altitude above sea level and ground obtained from a barometric altimeter. Means are provided for adjusting the reference on the barometric altimeter presentation so that the altitude of the terrain will be indicated.

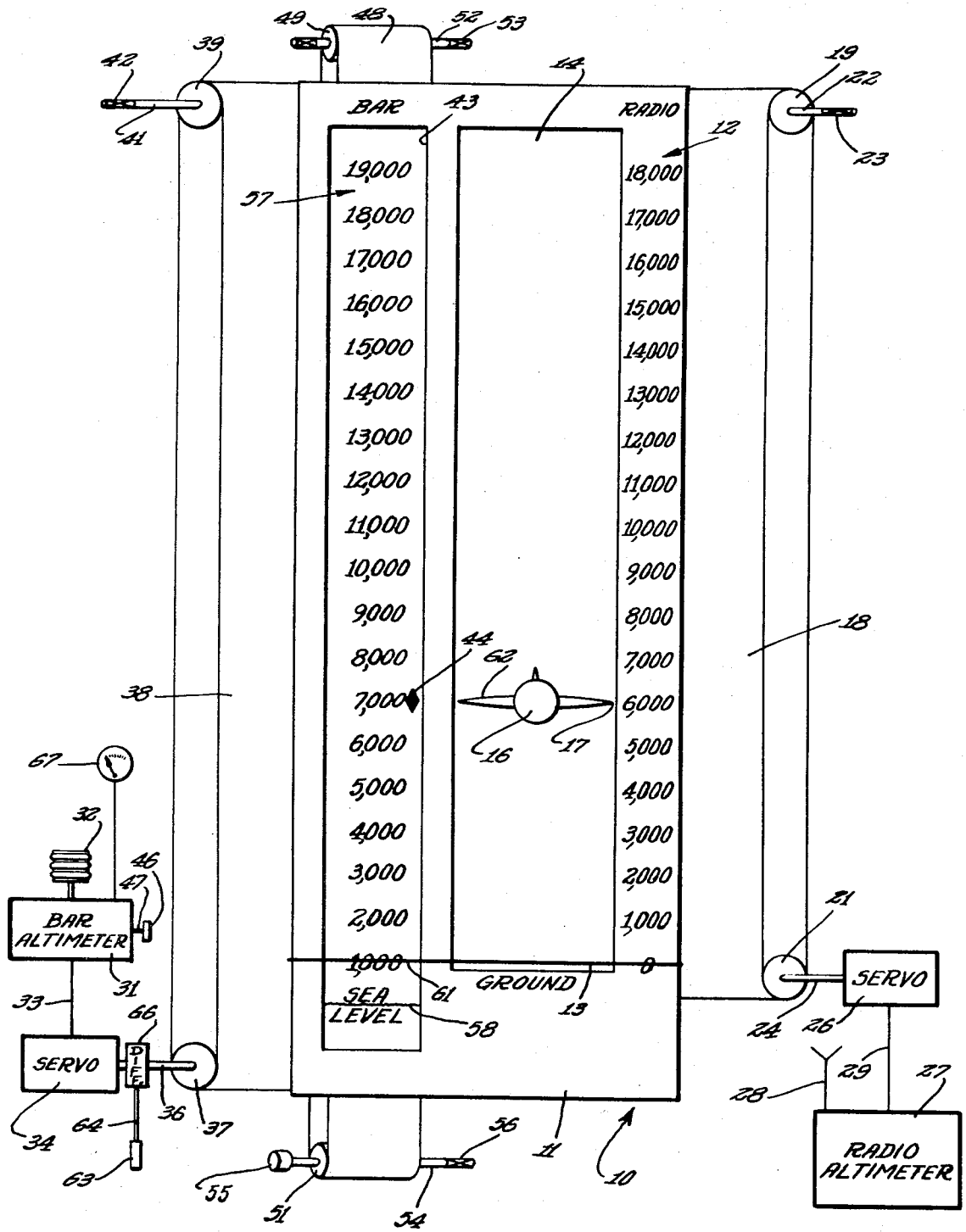

FULL DATA ALTIMETER DISPLAY

BACKGROUND OF THE INVENTION

1. Field of the Invention

This invention relates in general to altimeters and in particular to a combination altimeter which presents altitude based on absolute altitude above ground obtained from an radio altimeter and barometric altitude obtained from an barometric altimeter.

2. Description of the Prior Art

In the flight and control of aircraft it is very necessary for safety purposes to continuously know the altitude of the craft. For example, it is particularly critical when making blind landings to know exactly where the ground is so that structures adjacent the end of the runway are not encountered. Thus, the altitude above the terrain must be known. Radio altimeters which transmit pulses that are reflected by the ground are known for indicating the altitude above ground. Barometric altimeters which are based on the pressure variations in the altitude at various heights are also known. These generally indicate the altitude above sea level. Such altimeters may be set to read zero at a particular landing field, however if a cross-country flight is being made over terrain which varies in altitude above sea level, and particularly, if a landing is to be made at a field which has a different elevation from the field of takeoff, the barometric altitude will be in error if it had been set at zero at the takeoff point. Thus, it is conventional to set the barometric altimeter so that the elevation of the field is indicated when the aircraft is on the ground.

SUMMARY OF THE INVENTION

It is an object of the present invention to provide an altimeter which combines the best features of a radio altimeter with the best features of a barometric altimeter to indicate to the pilot his altitude above the ground at all times and to simultaneously produce a barometric altitude indication that may be correlated with the radio altitude to determine the terrain elevation at any time.

Other objects, features and advantages of the present invention will be readily apparent from the following detailed description of certain preferred embodiments thereof taken in conjunction with the accompanying drawings.

BRIEF DESCRIPTION OF THE DRAWING

The FIGURE illustrates the improved altitude indicator of this invention.

DESCRIPTION OF THE PREFERRED EMBODIMENT

The FIGURE illustrates the altimeter of this invention which comprises an indicator designated generally as 10 which is mounted in the cockpit of an aircraft to be readily visible to the pilot. The altimeter comprises a plate 11 which has printed along one edge, as for example, the right edge indicia 12 indicative of the altitude of the aircraft above ground as determined by a radio altimeter. For example, the indicia 12 starts from a ground indicator 13 and is marked off in 1,000-foot increments above the ground plane 13.

A rectangularly shaped window 14 is formed in the plate 11 through which an aircraft indicia 16 is visible and its wing tip 17 may be read against the radio altitude indicia 12. The aircraft indicia 16 is printed on an endless belt 18 which is carried by rollers 19 and 21. The roller 19 is supported by a shaft 22 mounted in a suitable bearing 23 supported from the airframe. The roller 21 is mounted on a shaft 24 which is connected to the output of a servomotor 26.

A radio altimeter 27 has an antenna 28 and produces an electrical input indicative of altitude to lead 29 which is connected to the servo 26.

In operation the radio altimeter is turned on when the aircraft is to be operated and the indicia 16 will be controlled by the servo 26 through the endless belt 18 so that it coincides with the ground indicator 13 printed on the plate 11. As the aircraft is operated and the altitude changes the radio altimeter 27 will move the endless belt 18 and cause the indicia 16 and wing tip 17 to continuously indicate against the indicia 12 the altitude of the craft above the ground.

A barometric altimeter 31 receives a pressure input from a bellows 32 and produces an electrical output on lead 33 which is supplied to a servo 34. The output shaft 36 of servo 34 is connected to a differential 66 which has a second input shaft 64 that has a knob 63. The output shaft 36 of differential 66 drives a roller 37 about which an endless belt 38 is mounted. The other end of the endless belt 38 passes over a roller 39 which is mounted on a shaft 41 mounted in a suitable bearing 42.

A window 43 is formed in the plate 11 of the instrument adjacent the window 14 and a barometric altitude indicia 44 is visible in the window 43. The barometric altitude indicia 44 is printed on the endless belt 38 and moves up and down as the altitude of the aircraft changes. A knob 46 is connected by shaft 47 to the altimeter 31 and allows the Kollsman number to be set into the altimeter in a conventional fashion.

A third endless belt 48 is mounted on rollers 49 and 51 respectively. The roller 49 is supported on a shaft 52 which is supported in suitable bearings 53, for example. The roller 51 is mounted on a shaft 54 which is supported in suitable bearings 56. A knob 55 is connected to shaft 54 and allows the endless belt 48 to be adjusted manually. Indicia 57 is printed on the endless belt 48 and is visible through the window 43. A sea level indicia 58 is printed on the endless belt 48 and the altitude indicia 57 progresses above sea level in 1,000-foot increments, for example.

The tape 48 may be transparent with the indicia 57 and 58 printed on it so that the barometric altitude indicia 44 may be visible. Alternatively, if the indicia 44 and tape 38 is placed above the tape 48, the tape 38 may be transparent.

In operation, when on the ground the pilot adjusts the knob 55 to move the endless belt 48 and its related indicia 57 and sea level indicator 58 until the ground indicia 13 printed on the plate 11 correctly indicates on the indicia 57 the elevation of the field at which the aircraft is located. For this purpose the indicia 13 comprises a short section 61 that extends across the window 43 which might comprise a short piece of wire that is in alignment with the remaining portion of the ground indicia 13. Thus, in the FIGURE the knob 55 has been turned while the aircraft was on the ground to indicate that the elevation of the field is 1,000 feet above sea level. It is to be realized of course that generally the sea level indicia 58 will be below the ground indicia 13 although in certain locations sea level may be above the ground indicia 13. In Holland, for example, certain airfields are below sea level.

After the indicia 57 and 58 have been adjusted to the proper elevation of the field the aircraft may be operated. When the main switches are turned on the radio altimeter 27 will be energized and the aircraft indicia 16 and its wing tip 17 will be aligned with the ground indicia 13 to indicate zero altitude above the ground. The left wing tip 62 relative to the FIGURE will indicate the elevation of the aircraft above sea level against indicia 57, which is the elevation of the field.

After takeoff the aircraft indicia 16 will move upwardly as the aircraft climbs and will continuously indicate with the wing tip 17 against the indicia 12 the altitude of the craft above ground.

Simultaneously, the indicia 44 will be driven through the endless belt 38 and the servomotor 34 to indicate the barometric altitude of the aircraft. If the terrain over which the aircraft is operating is at the same elevation as the airport from which the aircraft took off, the indicia 44 will be aligned with the left wing tip 62 of the aircraft indicia 16 and as the aircraft moves to different altitudes indicias 16 and 44 will move together with the wing tip 17 indicating against the indicia 12 the altitude above ground and the indicia 44 indicating the altitude above sea level.

If the elevation of the ground over which the aircraft is flying changes so that it is different from the elevation of the airport from which the aircraft took off, the indicia 44 will move away from the wing tip 62 of the aircraft 16. This is because the indicia 44 indicates the altitude of the aircraft above sea level. Simultaneously the wing tip 17 indicates against the indicia 12 the altitude of the aircraft above ground. Thus, as the ground elevation changes over which the aircraft passes the indicia 44 will move away from the wing tip 62.

To establish the correct elevation during flight at a particular point after the indicia 44 has moved away from the wing tip 62 the following procedure is carried out. First, the altitude between the barometric altitude indicia 44 and the wing tip 62 is observed. Suppose for example that the indicia 44 has moved up in the example of the FIGURE so that it is in line with the 8,000-foot marking on indicia 57 while the right wing tip 17 remains aligned with the 6,000-foot marking on indicia 12. The knob 55 is rotated to align the 8,000-foot mark on indicia 57 with the wing tip 62 of the aircraft indicia 16 and knob 63 is rotated to move the barometric altitude indicia 44 in alignment with the wing tip 62. The differential 66 is connected between the servo 34 and the shaft 36 which supports the roller 37 and allows the indicia 44 to be moved in response to either the barometric altimeter 31 or the knob 63.

The new setting will show that the ground beneath the craft is 2,000 feet above sea level and the sea level indicia 58 will have been moved 1,000 feet below its position in the FIGURE and the 2,000-foot mark of indicia 57 will be aligned with the ground indicator 13.

Periodically the pilot will obtain Kollsman numbers by radio from ground stations and he can adjust the knob 46 to adjust the barometer 31 to the proper Kollsman number. If this causes the indicia 44 to move out of alignment with the wing tip 62, the knobs 63 and 55 may be again adjusted to indicate the correct altitude. For redundancy and monitoring purposes a direct reading altimeter 67 may be also connected to the output of the barometric altimeter 31.

Thus, the invention allows the pilot to continually determine the elevation of the ground above sea level while simultaneously observing his altitude above ground and also observing his altitude above sea level.

It is to be realized of course that if the adjustments to knobs 55 and 63 are not made as explained above the barometric altitude indicia 44 will continue to properly indicate the barometric altitude against the indicia 57 and the aircraft indicia 16 will indicate against the indicia 12 the altitude of the aircraft above the ground as determined by the radio altimeter 27.

It is seen that this invention provides a new and novel altimeter and has redundancy so that if either the radio altimeter or the barometric altimeter fails a second source of altitude information will be available. The invention also provides continuous indication of the proper relation between the ground plane 13 and sea level indicator 58 and allows this relationship to be maintained. The aircraft indicia 16 may be properly damped to present a smooth presentation if desired.

Although minor modifications might be suggested by those versed in the art, it should be understood that I wish to embody within the scope of the patent warranted hereon all such modifications as reasonably and properly come within the scope of my contribution to the art.

I claim:

1. An altimeter for a body comprising, an indicator, a first indicia movably mounted on said indicator, a first scale on said indicator against which said first indicia is read, means for determining the altitude of the body above ground connected to the first indicia, a second indicia movably mounted on said indicator, means for determining the altitude of the body above a reference plane connected to the second indicia, a movable scale on said indicator against which said second indicia is read and settable relative to the first scale to indicate the vertical distance between ground and said reference plane.

2. An altimeter according to claim 1 comprising a ground plane indicia on said indicator.

3. An altimeter according to claim 1 wherein said indicator has a pair of windows with the first indicia visible through the first window, and the second indicia and second scale visible through said second window.

4. An altimeter according to claim 3 first, second and third endless belts upon which said first and second indicia, and said scale are respectively mounted.

5. An altimeter according to claim 4 wherein said second endless belt is transparent.

6. An altimeter according to claim 4 wherein said third endless belt is transparent.

7. An altimeter according to claim 3 means for moving said second scale.

8. An altimeter according to claim 3 comprising means for moving said second indicia independent of said means for determining the altitude of the body above a reference plane.

9. An altimeter comprising means for determining the altitude of a body above ground, means for determining the altitude of a body above a reference plane, an indicator, a first movable indicia movably mounted on said indicator and readable against a scale indicia including a ground indicia on said indicator to indicate height of the body above ground and said first movable indicia driven by said means for determining altitude above ground, a second movable indicia movably mounted on said indicator and driven by said means for determining the altitude of a body above a reference plane, a movable scale indicia against which said second movable indicia may be read to indicate height of the body above said reference plane, and said first and second movable indicia mounted adjacent each, and when said movable scale is positioned relative to the ground indicia of said scale indicia to indicate the vertical distance between said reference plane and said ground indicia at the location of the body the said first and second movable indicia are aligned.